United States Patent [19]
Young et al.

[11] Patent Number: 4,545,643
[45] Date of Patent: Oct. 8, 1985

[54] RETRO-REFLECTIVE ALIGNMENT TECHNIQUE FOR FIBER OPTICAL CONNECTORS

[75] Inventors: Christopher M. Young; Steven J. Cowen, both of San Diego, Calif.

[73] Assignee: The United States of America as represented by the Secretary of the Navy, Washington, D.C.

[21] Appl. No.: 491,504

[22] Filed: May 4, 1983

[51] Int. Cl.⁴ ............................................. G02B 7/26
[52] U.S. Cl. .............................. 350/96.20; 350/96.18; 350/96.21; 350/96.22; 350/320
[58] Field of Search ............... 350/96.15, 96.18, 96.20, 350/96.21, 96.22, 320

[56] References Cited

U.S. PATENT DOCUMENTS

| | | | |
|---|---|---|---|
| 4,188,087 | 2/1980 | D'Auria et al. | 350/96.2 |
| 4,215,937 | 8/1980 | Borsuk | 350/96.21 |
| 4,257,671 | 3/1981 | Barbaudy et al. | 350/96.15 |
| 4,266,852 | 5/1981 | Higgins et al. | 350/96.2 |
| 4,268,112 | 5/1981 | Peterson | 350/96.18 |
| 4,290,667 | 9/1981 | Chown | 350/96.18 |
| 4,357,072 | 11/1982 | Goodfellow et al. | 350/96.2 |
| 4,360,249 | 11/1982 | Slemon | 350/96.18 |
| 4,378,954 | 4/1983 | Baker | 350/96.20 X |
| 4,398,797 | 8/1983 | Wedertz et al. | 350/96.21 |

FOREIGN PATENT DOCUMENTS

| | | | |
|---|---|---|---|
| 130047 | 11/1978 | Japan | 350/96.15 |
| 25708 | 3/1981 | Japan | 350/96.21 |
| 2089061 | 6/1982 | United Kingdom | 350/96.18 |

*Primary Examiner*—William L. Sikes
*Assistant Examiner*—Frank González
*Attorney, Agent, or Firm*—Robert F. Beers; Ervin F. Johnston; Thomas Glenn Keough

[57] ABSTRACT

An apparatus and method provides an optically aligned connector for at least one optical fiber. A connector plate is machined with one flat surface which is placed in an abutting relationship on an optically flat mirror surface. A quarter pitch graded refractive index lens is inserted in a hole through the connector plate and bonded in place. The hole through the connector need not be precision bored nor is the fit between the lens and hole critical since the optical alignment is not dependent on these fittings but rather depends upon the abutting relationship of the flat abutting surface and the surface of the mirror. An optically excited fiber is brought to the close proximity of the lens and suitably micropositioned to a location where a maximum light intensity is monitored by a detector optically coupled to the excited fiber. When the fiber is positioned so that a maximum reflected intensity is monitored it is secured in place by, for example, a UV cureable adhesive. Mechanically indexing mating connector plates assure that an optical alignment from one fiber through its lens to another lens and onto another fiber is created. Multiple optical couplings between several pairs of fiber-lenses can simultaneously be created between a pair of appropriately designed connector plates. Optionally, appropriately machined collars held between single or multifibered connector plates are filled with an acceptable index matching fluid to assure suitable optical coupling.

20 Claims, 5 Drawing Figures

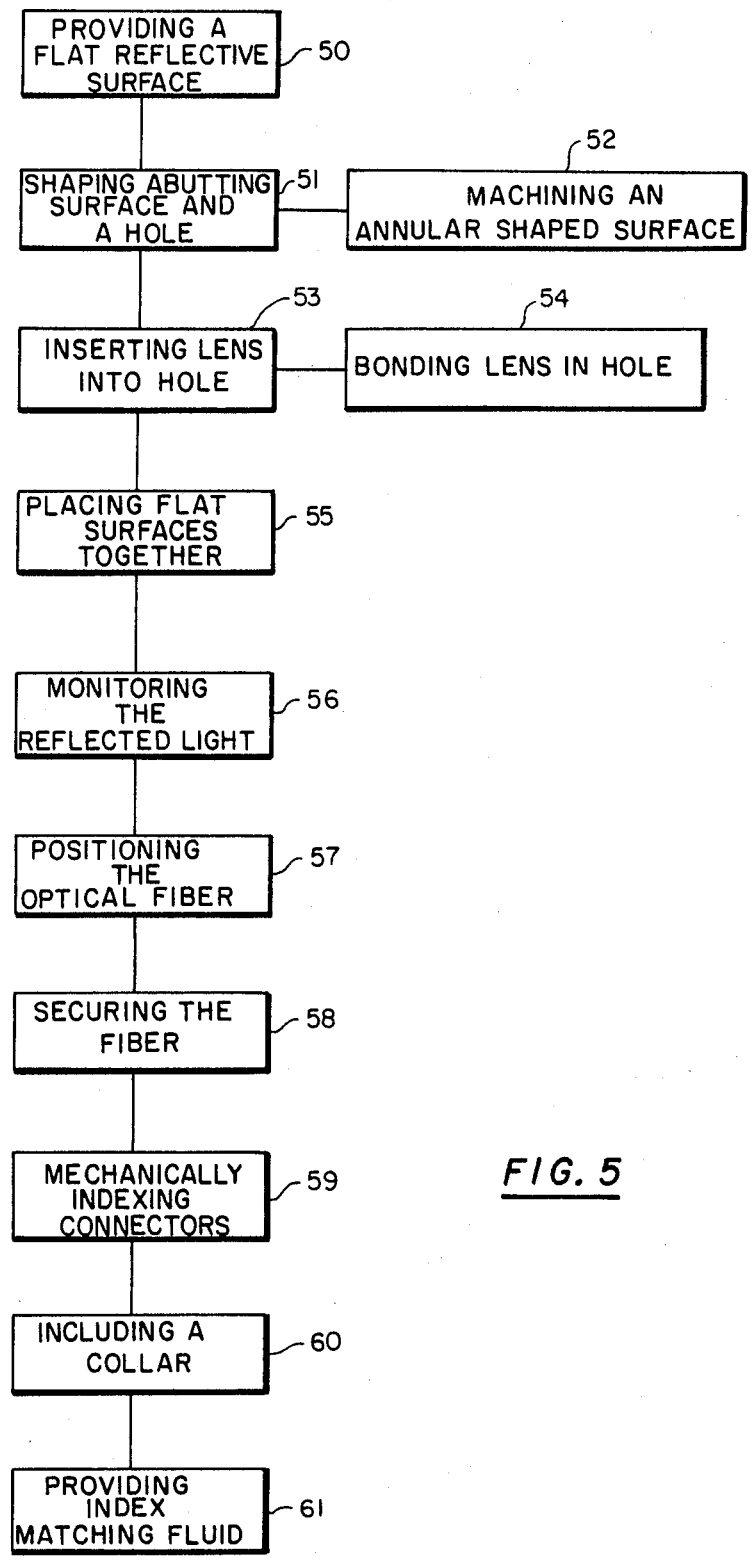

RETRO-REFLECTIVE ALIGNMENT TECHNIQUE FOR FIBER OPTICAL CONNECTORS

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This is related to copending United States patent application Ser. No. 333,152 by Steven J. Cowen entitled "Generalized Coupler Realization for use in Fiberoptic Systems", now abandoned; United States patent application Ser. No. 322,808 by Steven J. Cowen entitled "Hermatic High Pressure Fiberoptic Bulkhead Penetrator", still pending; and United States patent application Ser. No. 463,097 by Steven J. Cowen and Christopher M. Young entitled "Reproducible Standard for Aligning Fiberoptic Connectors Which Employ Graded Refractive Index Rod Lenses", now U.S. Pat. No. 4,509,827.

BACKGROUND OF THE INVENTION

Optical connectors, particularly those suitable for underwater use, have undergone transformation due to development of a new type of optical element. This has been properly identified as the graded refractive index rod lens (GRIN). Characteristically the GRIN lenses are many times larger in diameter than typical fibers and have a pattern of refractive index versus radius that is cylindrically symmetrical. A striking characteristic of the GRIN lenses is their capacity for deflecting, or rather refracting, an optical ray which diverges from the lens center axis back toward the axis. The rays which leave the axis within a particular angle will eventually become parallel to the axis and particularly in the case of a ¼ pitch GRIN lens will become collimated at the opposite end of the lens. In addition, ¼ nominal pitch length GRIN lenses re suitable for realizing low insertion loss fiberoptic connectors by virtue of their properly of expanding and collimating the light beam profile emanating from the core of an optical fiber. GRIN lenses are increasingly popular and may be of the type of focusing glass device manufactured by the Nipon Sheet Glass Company and Nipon Electric Company, Ltd., Osaka, Japan under the Trademark SELFOC. The SELFOC GRIN lenses are versatile and are the lenses used in a variety of applications in the first of referenced pending United States patent application listed above.

An optical connector using GRIN lenses has been found to be less sensitive to alignment tolerances which are usually attributed to imperfections in the mechanism used to align the lenses and their fibers and to discrepancies caused in machining the connector body itself. Because the fibers are usually quite small, in the neighborhood of 50 microns, their light transmission capability is limited so that insertion loss attributed to misalignment can seriously impair a system's usefulness because of excessive losses. The imperfections of many of the well known coupling schemes become apparent and the art is replete with designs which seek to avoid excessive insertion losses. Obviously the combination of the advancing state-of-the-art to include the GRIN lenses can improve the optical fiber-connector interface.

The second referenced United States patent application above brings GRIN lenses and optical fibers together through a pressurized hull. The connector reduces optical insertion losses attributed to the optical fiber drawing imperfections and consequent core eccentricity within the optical fiber cladding. The referenced application locates the core of the optical fibers on the surface of the rod lens when the connector is fabricated and installed to help provide for optimum beam collimation and avoids some of the mechanisms otherwise required to physically index to the outside of the fiber cladding. Quite acceptable optical fiber-connector interfaces are produced in the laboratory and under conditions where external controls may be rigidly applied. The measurement standards to indicate an acceptable coupling are applied during an adjustment procedure and produces connectors that can only be manufactured in matched pairs, that is to say one optical fiber-connector interface and another optical fiber-connector interface must be paired to assure an acceptable light transmission between the two fibers. The reason for this is that the location of the "receiving" fiber on the face of its corresponding rod lens must be adjusted in order to maximize the light capture from the "transmitting" fiber that is installed on the matching, complementary connector. A laboratory may create a standard and match other connectors to it. All subsequent connectors are aligned to this standard. This standard however may be far short of an optimum coupling and its reproducibility i.e. making sub masters may not be easily accomplished.

Another problem is that the matched pairs of optical fiber-connector interfaces must be properly aligned with one another in order to function properly and any rotation of either optical fiber-connector interfaces can further alter the transmissivity properties of the coupling.

The last cited patent application referred to above provides for an improved coupling between a fiber and a GRIN lens and is secured by the provision of a precision bored bushing and precision machined ferrule which is inserted in the bushing. Calibrating an optically aligned coupling calls for an insertion of a right cylinder having a diameter to allow a snug fitting in the precision-bored bushing so that a calibration autocollimation can occur with an adjustable axially exposed mirrored surface that reflects a laser beam. After the cylinder has been removed the laser beam is projected through and in parallel with the axis of the precision-bored bushing. The adjustable mirror surface separated from and perpendicular to an axial projection of the axis of the precision-bored bushing reflects the projected beam back over its own path to autocollimate the projected and reflected beams. A GRIN lens is inserted into a close fitting precision-bored ferrule and an optical fiber is excited by a light source. Positioning the excited optical fiber on an axial exposed surface of the GRIN lens and monitoring the light intensity reflected from the mirror through the GRIN lens and into the optical fiber allows a securing of the optical fiber at a location on the axial exposed surface where the magnitude of the monitored light is maximum. The foregoing method of the first referenced pending patent application helps assure a more acceptable coupling between a fiber and lens in a coupler.

Thus there is a continuing need for a readily reproducible alignment and coupling between an optical fiber and a GRIN lens in a connector that is readily accomplished and has the feature of being interchangeable.

SUMMARY OF THE INVENTION

The present invention is directed to providing an apparatus and method of providing an optically aligned connector for at least one sngle mode or multimode optical fiber. A mirror surface has a flat reflecting surface and a connector plate is provided with a flat abutting surface placed in adjacent contact with the flat reflective surface. A transverse hole has a GRIN lens fitted therein, a three axis micropositioner selectively relatively positions the light emanating end of the optical fiber with respect to a surface of the GRIN lens. A means for indicating the magnitude of the light intensity reflected from the mirror surface is optically coupled to the optical fiber and provides a maximum reading when the light emanating end of the optical fiber is optimally positioned by the three axis micropositioner to maximize the reflection of collimated light through the GRIN lens. A UV curable adhesive secures the fiber at its optimum position with respect to the end of the GRIN lens to assure an optically aligned coupling. Shaping the flat abutting surface of the connector plate in an annular shape reduces the machining and facilitates the optical alignment with another connector plate by merely resting their annular shaped abutting surfaces together. A mechanical indexing means assures alignment of connector plates each having several fiber-lens connections. Potting the fibers and lenses in a potting compound provides a more reliable, ruggedized connection.

The method of providing an optically aligned connector includes the providing of an flat reflective surface and the shaping of a flat abutting surface on a substantially orthogonal hole through a connector plate. Placing the flat abutting surface of the connector plate on the flat reflective surface of the mirror allows the inserting of a light collimated lens in the orthogonal hole and the monitoring of the magnitude of the light reflected from the flat reflecting surface through the light collimating lens and through at least a portion of the optical fiber. Positioning the emanating end of the optical fiber to a location where the monitored magnitude of reflected light is maximum and securing the emanating end in its position relative to the light collimating lens assures an optically aligned interconnection between the fiber and its lens. The flat abutting surface on the connector plate can be placed in a contiguous relationship with another similarly configured flat abutting surface on another connector plate to couple another optical fiber-lens.

It is a prime object of the invention to provide an improved optically aligned connector for an optical fiber.

A further object of the invention is to provide an optical fiber connector suitable for single and multimode fibers.

Another object of the invention is to provide a precise optical fiber connector of reduced complexity to allow its reproducibility.

Yet another object is to provide an optically aligned connector that reduces the complexity of fabrication and machining.

Still another object of the invention is to provide an optical connector that advantageously aligns with a GRIN lens to provide a reproducible standard.

Another object is to provide an optically aligned connector that is extremely sensitive and precise.

Still another object of the invention is to provide for the precise alignment of the fibers in a connector that is uncomplicated and requires no undue amount of skill.

Still another object of the invention is to provide an optically aligned connector that relies upon an instant curing adhesive to assure a rugged aligned interconnection.

Yet another object of the invention is to provide a method for fabricating an optically aligned connector that relies upon the abutting engagement of a flat machined surface on a mirror surface and the detection of maximum light reflection to indicate optimum alignment.

Yet another object of the invention is to provide a method allowing the reproducible uniform high standard optical coupling between a fiber and lens in a connector.

Still another object is to provide a method for assuring a reproducible uniform standard of coupling to allow the interconnection with other similarly configured connectors.

Still another object of the invention is to provide a method of the optical alignment of a plurality of fibers and lenses in an connector plate to assure optical alignment with a mating configured plate carrying similarly disposed lens-fibers.

Yet a further object is to provide a method and apparatus of providing an optically aligned connector that relies on components that are compact and portable to provide a field installation potential.

Yet another object of the invention is to provide a method of fabricating an optically aligned connector that doesn't require an undue amount of skill.

These and other objects of the invention will become more readily apparent from the ensuing description and claims when taken with the appended drawings.

BRIEF DESCRIPTION OF THE DRAWINGS

FIG. 5 sets forth a block diagram representation of the method of the inventive concept for optically aligning a fiber with a lens in a connector plate for reproducibility of a high standard.

DESCRIPTION OF THE PREFERRED EMBODIMENT

Figure 1:
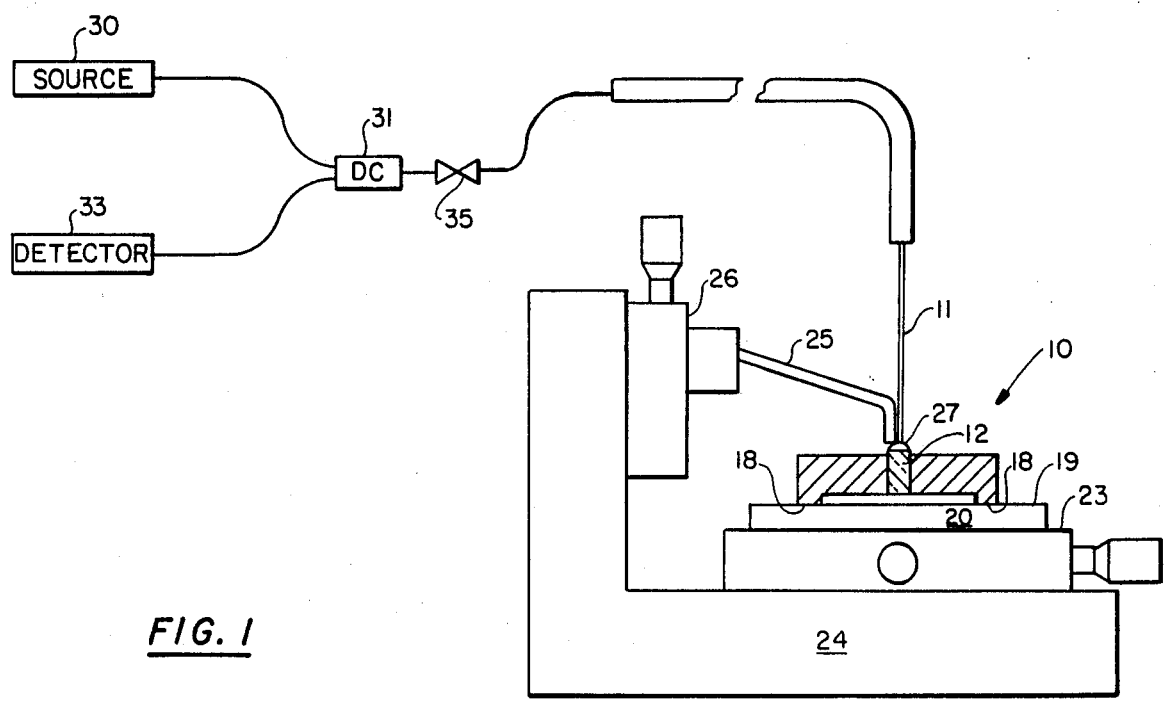
FIG. 1 depicts a schematic representation of the apparatus for fabricating optically aligned connectors in accordance with the teachings of this inventive concept showing a connector plate and lens in cross section.

Referring to the drawings, an optically aligned connector 10 provides for an improved optical coupling between at least one fiber 11 and a lens 12 both mounted on a connector plate 13 as well as between two connectors. The optical coupling is fabricated to bidirectionally link a point source of light from a fiber to a relatively wide collimating lens and from the lens to a fiber with reduced insertion losses.

The fiber can be any one of a host of single and multimode designs that are widely used for optical data transmission. Typically, a multimode fiber core has a fifty micron diameter with a one hundred twenty five micron cladding diameter and can be considered, from a practical point of view, a point source/receiver of optical data. Single mode fibers have smaller core diameters and also are considered point sources.

The lens selected for a typical interface is a ¼ pitch GRIN lens of the type marked under the trademark SELFOC. A ¼ pitch GRIN lens, a SLS-2.0-0.25P, noncoated lens by Nippon Sheet Glass, was found to have about a ten micron standoff and a five micron lateral tolerance from a location adjacent the axially exposed face 14 of lens 12 at 0.85 micron light. This location is defined as an optimum location 15 from which the light emanating end 16 of the fiber is positioned relative to the lens that collimates the light through the lens to maximize its reflection in a manner to be elaborated on below.

Connector plate 13 has an essentially disk-shaped configuration and is machined from a rigid material, metal or plastic-like, that serves a mounting and alignment structure. At least one transverse hole 17 is provided in the connector plate. This need not be a precision bore but only what would be routinely expected. This inventive concept avoids the necessity of precision bores and their alignment with all the associated apparatus.

The hole is substantially orthogonally disposed with respect to a flat annular surface 18 machined and lapped to have an annular coplanar surface. Although the flat surface could have several different shapes, the annular surface is easily shaped on a lathe and is flat lapped in accordance with accepted procedures.

The flat annular surfaces are lapped to optically flat tolerances and are to be placed on an optically flat reflecting surface 19 of mirror 20. The mirror is typically a λ/4 38 m/m diameter mirror manufactured by Melles Griot. The flat annular surfaces on the connector plate cooperating with the reflecting surface orient hole 17 orthogonal with the reflecting surface.

A ¼ pitch GRIN lens 12 is inserted to slideably fit within hole 17 and an adhesive 21 is applied to coat the lens and inside of the hole. After the adhesive hardens, the lens is securely held in the hole with its exposed face 14 held slightly above the upper surface of connector plate 13.

Mounting of fiber 11 to couple and collimate emanating light or decollimate and collect received light with the GRIN lens calls for the precise location of the emanating end 16 of the fiber with respect to exposed face 14 of the lens. For this reason an X—Y axis micropositioner 23 is secured on a solid base 24. The X—Y axis micropositioner is manufactured by Line Tool Co. and functions to impart microscopic orthogonal, two-dimensional displacements to whatever is mounted on it.

The mirror 20 is mounted on the X—Y micropositioner and fiber 11 is held in a vacuum air chuck 25 that is displaced vertically by a Z axis micropositioner 26. The air chuck is a tube having a number of holes near its lower tip. Attaching a vacuum pump to the tube causes air to be pulled through the holes and a fiber, fiber 11, is held adjacent the chuck and to be responsively raised and lowered by the Z positioner.

Optionally all three of the X, Y and Z axis displacements could be imparted to either the fiber or the connector plate-lens alone with the other element being held stationary. Or, the X and Y displacements could be coupled to the air tube and the Z axis to the lens.

With a particular GRIN lens the optimum location 15 for light emanating end 16 was found to be about a ten micron standoff from exposed face 14 of lens 12. The Z axis microprocessor is capable of positioning the fiber with this separation. The X and Y micropositioner is entirely capable of laterally positioning light emanating end 16 within five microns of where the best reading was monitored.

Applying an ultraviolet cureable adhesive 27, and bathing it in ultraviolet radiation hardens the adhesive and securely holds the fiber in place. A miniscus shaped drop of the ultraviolet cureable was found to be adequate to assure the proper securing at its proper location.

Accurate positioning of the fiber to assure proper alignment of the fiber and lens is assured by optically exciting fiber 11 from a source 30. The source, for example, a laser, is coupled to fiber 11 by a directional coupler 31.

Light reflected from mirror 20 through lens 12 and fiber 11 passes once again through directional coupler 31 and to a detector 33 where the relative mangitude of the reflected light is observed or recorded. Detectors of this type are well known in the art. Optionally, a coupler 35 is provided to link the source detector and directional coupler to fiber 11, it being found expedient to do so to enable the more rapid alignment of successive fibers and lenses. A typical coupler could be one fabricated in accordance with this invention.

When a maximum intensity is observed it indicates that convergence and divergence of the light at the lens-fiber interface are minimum as well as meaning that the light coming out of the lens to the mirror is collimated perpendicular to reflecting surface 19 so that it is all reflected back through the lens, the fiber and monitored at the detector. In other words, proper alignment is sensed by maximizing the amount of light coupled back into the fiber which is sensed by the detector.

After the maximum reflection is noted, the optical fiber is held in place by exposing the ultraviolet cureable adhesive. Next, the lens-fiber interface is potted in an epoxy adhesive 36 which is covered by a connector backshell 37.

Figure 2:
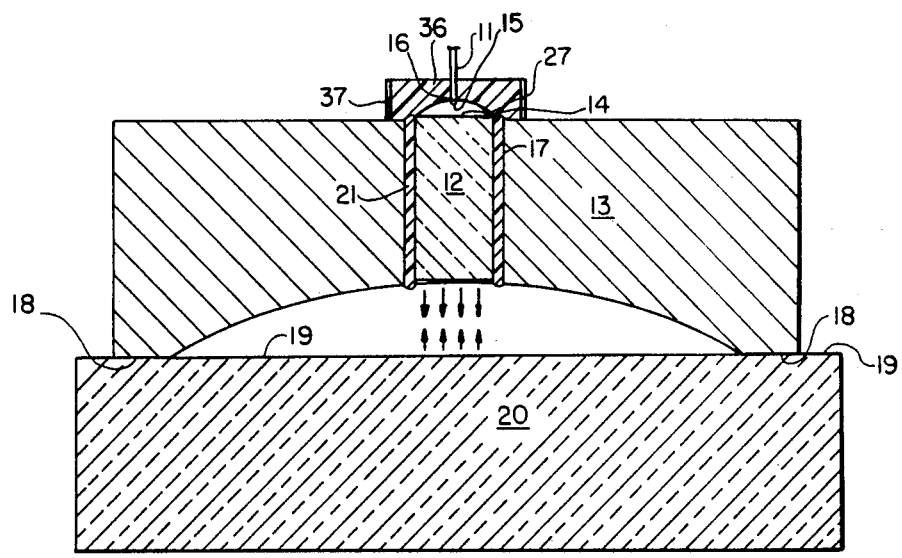
FIG. 2 is a cross-sectional representation of one embodiment of a connector plate provided with a single bonded GRIN lens and its optically connected fiber.
Figure 3:
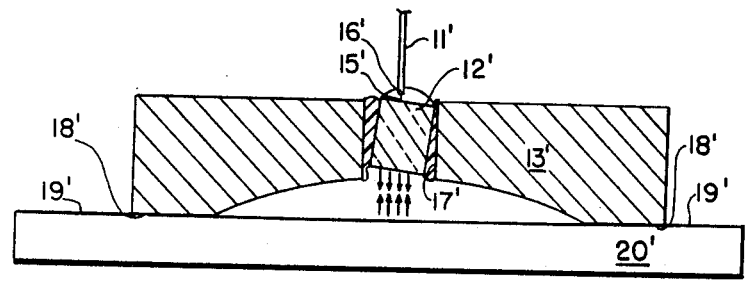
FIG. 3 is another cross-sectional showing of the connector plate of FIG. 2 in which a greatly exaggerated depiction of a misaligned GRIN lens within a transverse hole and the fiber secured off-center with respect to the lens axis.

Noting FIG. 3 a greatly exaggerated misalignment of a lens 12' in its associated traverse hole 17' is shown to further demonstrate the fact that the hole need not be precison bored to assure a maximized optical coupling. A characteristic of the SELFOC GRIN lens is that light coming from a source point, such as from fiber 11' will be collimated and redirected perpendicular to reflecting surface 19' of mirror 20', as shown, when light emanating end 16' is optimally located (in this instance this is above the mechanical axis of the lens as depicted). This optically aligned coupler would couple light between it and another coupler by merely placing its flat annular surface 18' on the flat annular surface 18' of another connector, such as shown in FIG. 2. Because both couplers have their light from their fibers collimated through their lenses and perpendicular to their reflecting surfaces 19', and flat annular surfaces 18', i.e. when aligned, they reflect light perpendicularly from their reflective surfaces, they will be capable of optically coupling one to the other by merely abutting their abutting flat surfaces.

Figure 4:
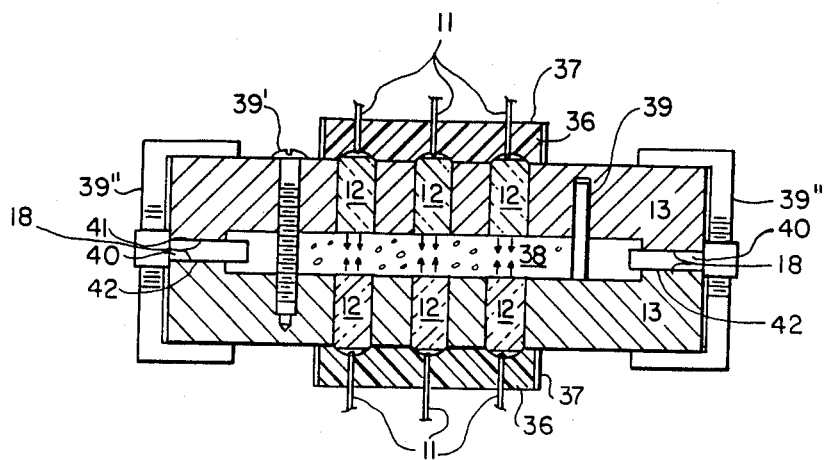
FIG. 4 shows a variation of the inventive concept in cross section in which indexing means are machined and provided to align a plurality of optical fiber-lens combinations.

All that is required is to hold them together by satisfactory clamps or other means and, if desirable, fill the spaces between the coupler plates with an index matching fluid 38, see FIG. 4. The GRIN lenses of the type discussed have been found to satisfactorily couple one with the other at separation of up to about two centimeters.

A multiple fiber-lens connector is shown in FIG. 4. The fibers are mounted as discussed above and, in this regard, several single fiber-lens combinations may be located in appropriately disposed traverse holes. Another connector plate 13 has correspondingly disposed fiber-lens combinations for optical interconnection. At least one pin-and-hole combination 39 is provided to properly index both plates with respect to each other including the lens-fiber combinations between the two connectors. A threaded both and threaded hole set 39' may be preferable since this would hold the connectors together. Additional clamps, two are schematically depicted as clamp 39'', for holding the connectors together with their flat annular surfaces 18 in a close abutting relationship are included to assure optical coupling. Other means also can be provided to hold the flat annular surfaces together to assure an alignment of lenses. An index matching fluid can be provided. FIG. 4 shows only one pin-and-hole combination and one threaded bolt and hole set, it being understood that at least two of each or in combination are preferable for proper indexing of the flat annular surfaces and the fiber lenses. Although not shown, an outer sleeve arrangement could be included to house the joined connector plates. The arrangement has an outer threaded sleeve that engages a threaded surface and draws itself together and exerts a uniform compressive force. This compressive force is transferred to the connector plates to further assure that the abutting relationship of the flat surfaces is maintained as well as the consequent optical alignment.

An annular spacer ring 40, only shown on the left side of connector 13 in FIG. 3, can be included if desired. Opposite faces 41 and 42 are machined parallel and made optically flat to accommodate the annular flat surfaces 18 of the connector plates. This mechanical coaction places the lenses in their aligned orientation for maximum light transmission. The inside of the spacer ring can be threaded to mate with correspondingly shaped threads on the outside of the connector plates, not shown in the drawings.

Looking to FIG. 5 a flow chart of the method of fabricating an aligned coupling starts with providing 50 a flat reflective mirror surface and shaping 51 a flat abutting surface in a connector plate. Aside from these surfaces, there is no providing of precision surfaces among the elements to be joined together. A machining 52 and lapping, if necessary, of the annular flat abutting surface is all that is necessary.

Inserting 53 a GRIN lens into a transverse hole provided in the connector plate and bonding 54 it in place enables a following alignment sequence after the placing 55 of the flat surface presented by the annular abutting surface on the exposed surface of the mirror.

Monitoring 56 the reflected light and positioning 57 the emanating end of the fiber relative to the lens surface allows the securing 58 of the fiber when the reflected light intensity is maximum.

Indexing 59 a pair of connectors together assures light coupling between connectors and including 60 a collar and providing 61 an index matching fluid help improve the capabilities of the coupler.

Obviously many modifications and variations of the present invention are possible in the light of the above teachings. It is therefore to be understood that within the scope of the appended claims the invention may be practiced otherwise than as specifically described.

What is claimed is:

1. An apparatus for providing an optically aligned connector for at least one optical fiber having an end receiving light from a source and it other end emanating the light comprising:
   means for reflecting light having a flat reflective surface;
   a connector plate having a flat abutting surface sized to fit on the flat reflective surface in laterally displaceable adjacent contact with the flat reflective surface and provided with a transverse hole orthogonally disposed with respect to the flat reflective surface irrespective of the lateral displacement thereof on the flat reflective surface;
   means sized to fit and be secured within the hole for collimating light therethrough;
   means operatively disposed with respect to the optical fiber and the connector plate for selectively relatively positioning the light emanating end of the optical fiber with respect to the means for collimating light;
   means optically coupled to the optical fiber for indicating the magnitude of the light intensity reflected from the means for reflecting light, the means for indicating light intensity provides a maximum reading when the light emanating end of the optical fiber is optimally positioned by the means for selectively relatively positioning to maximize the intensity of the reflection of collimated light therethrough; and
   means disposed adjacent the means for collimating light and the optical fiber for securing their relative disposition when the optical fiber is said optimally positioned other than movements of the means for selectively relatively positioning, the flat reflective surface and the flat abutting surface are the only mechanically precisioned surfaces of the apparatus.

2. An apparatus according to claim 1 in which the flat abutting surface of the connector plate is annular-shaped.

3. An apparatus according to claim 2 further including:
   mechanical indexing means provided on the connector plate configured to mate with the mechanical indexing means on another connector plate to assure an aligned coupling of light therebetween when at least a portion of the flat abutting surfaces of each connector plate contiguously abut together.

4. An apparatus according to claim 3 further including:
   means disposed in the hole of the connector plate for bonding the means for collimating light therein.

5. An apparatus according to claim 4 in which the means for reflecting light is a mirror and the means for collimating light is a quarter pitch graded refractive index lens.

6. Apparatus according to claim 5 in which the means for selectively relatively positioning is a three orthogonal axis micropositioner connected to impart three dimensional displacement of the light emanating end of the optical fiber with respect to a surface of the quarter pitch graded refractive index lens.

7. An apparatus according to claim 6 further including:
a directional coupler optically connecting the source of light and the means for indicating reflected light intensity to the optical fiber.

8. An apparatus according to claim 3 further including:
means having parallel flat surfaces shaped to contiguously abut the flat abutting surfaces of each connector and provided with an opening for spacing the connector plates apart in optical alignment with each other.

9. An apparatus according to claim 8 in which the means for spacing is collar-shaped and the opening is filled with an index matching fluid.

10. An apparatus according to claim 9 in which a plurality of fibers are each provided a light emanating end said optimally positioned with a graded refractive index lens to enable a simultaneous aligned coupling between the plurality of fibers upon the mating of the means for mechanical indexing.

11. An apparatus according to claim 3 in which a plurality of fibers are each provided a light emanating end said optimally positioned with a graded refractive index lens to enable a simultaneous aligned coupling between the plurality of fibers upon the mating of the means for mechanical indexing.

12. A method of providing an optically aligned connector for at least one optical fiber having one end receiving light from a source and its other end emanating the light comprising:
providing a flat reflective surface;
shaping a flat abutting surface on a connector plate that is sized to fit on the flat reflective surface and shaping a substantially orthogonal hole through the connector plate that is substantially orthogonal to the flat abutting surface;
placing the flat abutting surface of the connector plate contiguously on the flat reflective surface;
inserting and affixing a light collimating lens in the orthogonal hole;
monitoring the magnitude of the light reflected from the flat reflecting surface, through the light collimating lens and through at least a portion of the optical fiber;
positioning the emanating end of the optical fiber to a location where the monitored magnitude of reflected light is maximum; and
securing the emanating end in its position relative to the light collimating lens.

13. A method according to claim 12 in which the shaping of the flat abutting surface is the machining of an annular-shaped flat abutting surface.

14. A method according to claim 13 further including:
providing indexing surfaces on the connector so that mating connectors make an aligned coupling therebetween.

15. A method according to claim 14 further including:
bonding the inserted light collimating lens in the orthogonal hole.

16. A method according to claim 15 further including:
potting the secured fiber and end of the light collimating lens together.

17. A method according to claim 16 in which the step of positioning is using a three axis micropositioner to place the emanating end of the optical fiber at a position with respect to the end of the light collimating lens where a maximum reflected light is monitored.

18. A method according to claim 17 in which there is the providing of a plurality of lenses having aligned and secured fibers in a single connector each having a flat abutting surface.

19. A method according to claim 18 in which the indexing surfaces mate to align the plurality of lenses and fibers in one connector with the plurality of lenses and fibers in another and filling any void between the two connectors with an index matching fluid.

20. A method according to claim 19 in which there is the inserting of a ring-shaped spacer having flat parallel facings between the flat abutting surfaces of the connectors and filling the interior thereof with an index matching fluid.

* * * * *